United States Patent
Ryu et al.

(10) Patent No.: US 9,633,006 B2
(45) Date of Patent: Apr. 25, 2017

(54) QUESTION ANSWERING SYSTEM AND METHOD FOR STRUCTURED KNOWLEDGEBASE USING DEEP NATURAL LANGUAGE QUESTION ANALYSIS

(71) Applicant: Electronics and Telecommunications Research Institute, Daejeon (KR)

(72) Inventors: Pum Mo Ryu, Daejeon (KR); Hyun Ki Kim, Daejeon (KR); Yong Jin Bae, Daejeon (KR); Hyo Jung Oh, Daejeon (KR); Chung Hee Lee, Daejeon (KR); Soo Jong Lim, Daejeon (KR); Joon Ho Lim, Daejeon (KR); Myung Gil Jang, Daejeon (KR); Mi Ran Choi, Daejeon (KR); Jeong Heo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/932,604

(22) Filed: Nov. 4, 2015

(65) Prior Publication Data

US 2016/0147737 A1 May 26, 2016

(30) Foreign Application Priority Data

Nov. 20, 2014 (KR) ........................ 10-2014-0162398

(51) Int. Cl.
*G06F 17/27* (2006.01)
*G06F 17/30* (2006.01)

(52) U.S. Cl.
CPC ........ *G06F 17/2785* (2013.01); *G06F 17/271* (2013.01); *G06F 17/277* (2013.01);

(Continued)

(58) Field of Classification Search
CPC ............... G06F 17/2785; G06F 17/271; G06F 17/2755; G06F 17/277; G06F 17/2775; G06F 17/30401; G06F 17/30976
See application file for complete search history.

(56) References Cited

U.S. PATENT DOCUMENTS 4,914,590 A * 4/1990 Loatman ............... G06F 17/279
704/8
5,020,021 A * 5/1991 Kaji .................... G06F 17/2735
704/2

(Continued)

FOREIGN PATENT DOCUMENTS

KR 100305592 B1 9/2001
KR 100434688 B1 6/2004

*Primary Examiner* — Eric Yen
(74) *Attorney, Agent, or Firm* — William Park & Associates Ltd.

(57) ABSTRACT

Disclosed are a question answering system for structured knowledgebase using deep natural language question analysis, and a method thereof, the question answering system for structured knowledgebase using deep natural language question analysis includes a deep natural language question analysis unit configured to create a structure of a semantic frame by analyzing a natural language question that is input, a question-intermediate expression creation unit configured to create a question-intermediate expression of a lexicon level based on the semantic frame, a knowledgebase-specialized query creation unit configured to create a query used to search in knowledgebase that is a subject of search, based on the question-intermediate expression, and a knowledgebase search unit configured to find a correct answer in the knowledgebase that is subject of search based on the query, to provide an accuracy of the correct answer, a confidence of the correct answer and an evidence for the correct answer.

20 Claims, 5 Drawing Sheets

(52) U.S. Cl.
CPC ...... G06F 17/2755 (2013.01); G06F 17/2775 (2013.01); G06F 17/30401 (2013.01); G06F 17/30976 (2013.01)

(56) References Cited

U.S. PATENT DOCUMENTS

| | | | | |
|---|---|---|---|---|
| 5,237,502 | A * | 8/1993 | White | G06F 17/2705 704/1 |
| 5,386,556 | A * | 1/1995 | Hedin | G06F 17/271 |
| 5,584,024 | A * | 12/1996 | Shwartz | G06F 17/30392 |
| 5,768,578 | A * | 6/1998 | Kirk | G06F 17/30433 |
| 5,933,822 | A * | 8/1999 | Braden-Harder | G06F 17/30684 |
| 5,995,920 | A * | 11/1999 | Carbonell | G06F 17/21 704/9 |
| 6,243,670 | B1 * | 6/2001 | Bessho | G06F 17/2785 704/9 |
| 6,560,590 | B1 * | 5/2003 | Shwe | G06F 17/30684 706/55 |
| 6,571,235 | B1 * | 5/2003 | Marpe | G06F 17/30873 |
| 6,965,857 | B1 * | 11/2005 | Decary | G06F 17/2705 704/1 |
| 7,717,712 | B2 * | 5/2010 | Brun | G06F 17/274 434/156 |
| 8,059,790 | B1 * | 11/2011 | Paterik | G06F 17/27 370/352 |
| 8,195,649 | B2 | 6/2012 | Doyle | |
| 8,380,713 | B2 | 2/2013 | Oh | |
| 8,744,837 | B2 | 6/2014 | Heo | |
| 9,262,406 | B1 * | 2/2016 | Das | G06F 17/289 |
| 2002/0042707 | A1 * | 4/2002 | Zhao | G06F 17/27 704/9 |
| 2003/0216905 | A1 * | 11/2003 | Chelba | G06F 17/271 704/9 |
| 2004/0193399 | A1 * | 9/2004 | Potter | G06F 17/273 704/4 |
| 2005/0005266 | A1 * | 1/2005 | Datig | G06F 17/279 717/136 |
| 2005/0080613 | A1 * | 4/2005 | Colledge | G06F 17/2785 704/9 |
| 2007/0006128 | A1 * | 1/2007 | Chowdhary | G06F 17/30395 717/104 |
| 2007/0055656 | A1 * | 3/2007 | Tunstall-Pedoe | G06F 17/30654 |
| 2007/0078814 | A1 * | 4/2007 | Flowers | G06F 17/30684 |
| 2007/0078815 | A1 * | 4/2007 | Weng | G06F 17/30401 |
| 2008/0071814 | A1 * | 3/2008 | Mittal | G06F 17/30911 |
| 2009/0119090 | A1 * | 5/2009 | Niu | G06F 17/24 704/1 |
| 2010/0057463 | A1 * | 3/2010 | Weng | G06F 17/27 704/257 |
| 2011/0320187 | A1 | 12/2011 | Motik et al. | |
| 2012/0084076 | A1 * | 4/2012 | Boguraev | G06F 17/2735 704/9 |
| 2012/0278062 | A1 * | 11/2012 | Cheng | G06F 17/2872 704/3 |
| 2013/0238312 | A1 * | 9/2013 | Waibel | G10L 15/00 704/8 |
| 2014/0236579 | A1 * | 8/2014 | Kurz | G06F 17/28 704/9 |
| 2015/0331850 | A1 * | 11/2015 | Ramish | G06F 17/28 704/9 |
| 2016/0055240 | A1 * | 2/2016 | Tur | G06F 17/277 707/706 |
| 2016/0239739 | A1 * | 8/2016 | Das | G06F 17/289 |

* cited by examiner

FIG. 6

| NATURAL LANGUAGE QUESTION | X-RAYS FOUND BY THIS PERSON BECAME A TURNING POINT TO OPEN RADIOLOGY AGE. WHO IS THIS SCIENTIST HAVING RECEIVED NOBEL PRIZE IN PHYSICS? | Submit |
|---|---|---|

| Num. | CATAGORY | VALUE |
|---|---|---|
| 1 | ANSWER | WILHELM CONRAD RONTGEN |
|  | ACCURACY | 0.9 |
|  | CONFIDENCE | 0.8 |
|  | EVIDENCE | [WILHELM CONRAD RONTGEN]-(InventorOf)-[X-RAYS] [WILHELM CONRAD RONTGEN]-(HasPrize)-[NOBEL PRIZE IN PHYSICS] |
| 2 | ANSWER | MARIE CURIE |
|  | ACCURACY | 0.5 |
|  | CONFIDENCE | 0.8 |
|  | EVIDENCE | [MARIE CURIE]-(HasPrize)-[NOBEL PRIZE IN PHYSICS] |

QUESTION ANSWERING SYSTEM AND METHOD FOR STRUCTURED KNOWLEDGEBASE USING DEEP NATURAL LANGUAGE QUESTION ANALYSIS

CROSS-REFERENCE TO RELATED APPLICATION

This application claims priority to and the benefit of Korean Patent Application No. 10-2014-0162398, filed on Nov. 20, 2014, the disclosure of which is incorporated herein by reference in its entirety.

BACKGROUND

1. Field of the Invention

The present invention relates to a system for converting a natural language question into a query to search a certain database or a certain knowledgebase and performing search by use of the query and a method thereof, and more particularly, to a system for converting a natural language question into a query to search a standardized knowledgebase by using a deep language analysis technology and searching for a correct answer by using the converted query, and a method thereof.

2. Discussion of Related Art

There have been inventions or studies on a method for converting a natural language question into a query to search a certain database or knowledgebase, which has been conducted by using a method of matching a natural language question to a predefined search query.

However, the method has limitation in the form of the natural language question and the range of extracted knowledge/correct answer. In addition, a method of generating a query language for a certain type of knowledgebase has difficulty in using various types of knowledgebase.

In a relevant patent "Natural Language Question-Answering Search System for Integrated Access to Database, FAQ and Web Site", a natural language question is assigned a semantic code that contains Schema information of Korean language wordnet information/domain dictionary DB, a query language assigned with a sematic code includes a vocabulary, a part of speech, PLO information, syntax information and a semantic code of a query sentence, and the form of Structured Query Langue (SQL) that is a dialog type database query sentence previously stored through a lexio-syntactic pattern determiner described in regular expressions is determined. The determined SQL query is used to find the optimum answer in database.

Another relevant patent, "Natural Language Question Answering System And Method Based On Deep Semantics (U.S. Ser. No. 13/171,391)" suggests a method of finding a correct answer by receiving a natural language question, performing deep analysis on the natural language question, mapping the natural language question into a "deductive database" query, and searching in "deductive database" by using the mapped query. However, the knowledgebase to be searched is limited to deductive database.

The above described relevant patents use a method of selecting a query that is mapped to an input question among predefined standardized queries. In this case, a query specialized in knowledgebase is created at a level of surface lexicon analysis on a natural language question, so there is limitation of the format and the content of a question at the time of mapping a natural language question and elements of knowledgebase.

SUMMARY OF THE INVENTION

The present invention is directed to a question answering system for searching for a correct answer by converting a natural language question into a query to search in standardized knowledgebase by using a deep language analysis on a natural language question and searching in knowledgebase using the converted query, and a method thereof.

The present invention is directed to a question answering system for searching for a correct answer by creating a question-intermediate expression by extracting a question focus and lexicon information, structure information and semantic information that limit the question focus from a natural language question, and structuralizing the extracted question focus and the extracted information, and by converting an intermediate semantic structure into various standardized database queries, and a method thereof.

The present invention is directed to a question answering system for flexibly responding by using various knowledgebase queries through creating "question intermediate expressions" independent of respective standardized knowledgebase.

The present disclosure is not limited to the purposes described above, and other purposes not described above can be understood to the skilled in the art through the description in this disclosure.

According to an aspect of the present invention, there is provided a question answering system for structured knowledgebase using deep natural language question analysis, the question answering system including a deep natural language question analysis unit, a question-intermediate expression creation unit, a knowledgebase-specialized query creation unit and a knowledgebase search unit. The deep natural language question analysis unit may be configured to create a structure of a semantic frame by analyzing a natural language question that is input. The question-intermediate expression creation unit may be configured to create a question-intermediate expression of a lexicon level based on the semantic frame. The knowledgebase-specialized query creation unit may be configured to create a query used to search in knowledgebase that is a subject of search, based on the question-intermediate expression. The knowledgebase search unit may be configured to find a correct answer in the knowledgebase that is subject of search based on the query, to provide an accuracy of the correct answer, a confidence of the correct answer and an evidence for the correct answer.

The deep natural language question analysis unit may create the semantic frame by analyzing the natural language question in terms of morpheme, named entity, syntax and semantic role.

The deep natural language question analysis unit may divide the natural language question in units of morphemes, and may assign a morpheme tag to each of the morphemes.

The deep natural language question analysis unit may recognize an entity of the natural language question based on a result of the morpheme analysis of the natural language question, and may assign a type to the entity.

The deep natural language question analysis unit may assign a dependency relation between word-phrases by analyzing a dependency syntax structure of the natural language question based on a result of the morpheme analysis of the natural language question.

The deep natural language question analysis unit may determine a semantic role of an argument for a predicate of the natural language question based on results of the morpheme analysis and the syntax analysis of the natural language question.

The question-intermediate expression creation unit may recognize a question focus from the natural language question, and may create a lexicon level-query format based on a semantic frame including the question focus.

The question-intermediate expression creation unit may create the question-intermediate expression including a variable by which the question focus is replaced using a certain sign and a condition which expresses restriction information about the variable. The condition may be expressed by a type predicate semantic frame which represents a type of a correct answer for the variable, and a lexicon predicate semantic frame that has a format obtained by replacing the question focus in the semantic frame by the variable.

The knowledgebase-specialized query creation unit may create a query specialized in a certain knowledgebase by mapping an argument of the question-intermediate expression into a class defined in the certain knowledgebase or an instance, and mapping a predicate of the question-intermediate expression into a property defined in the certain knowledgebase.

According to another aspect of the present invention, there is provided a question answering method for structured knowledgebase using deep natural language question analysis, the question answering method including: creating a structure of a semantic frame by analyzing a natural language question that is input; creating a question-intermediate expression of a lexicon level based on the semantic frame; creating a query used to search in knowledgebase that is a subject of search, based on the question-intermediate expression; and finding a correct answer in the knowledgebase that is subject of search based on the query, to provide an accuracy of the correct answer, a confidence of the correct answer and an evidence for the correct answer.

The creating of the structure of the semantic frame may include dividing the natural language question in units of morphemes, and assigning a morpheme tag to each of the morphemes, recognizing an entity of the natural language question based on a result of the morpheme analysis of the natural language question, and assigning a type to the entity, assigning a dependency relation between word-phrases by analyzing a dependency syntax structure of the natural language question based on a result of the morpheme analysis of the natural language question, and determining a semantic role of an argument for a predicate of the natural language question based on results of the morpheme analysis and the syntax analysis of the natural language question.

The creating of the structure of the semantic frame may include creating the structure of the semantic frame having dependents, including a subject, an object and an adverb with respect to a predicate of the natural language question, as arguments based on results of the morpheme analysis, the syntax analysis and the semantic role analysis of the natural language question.

The creating of the structure of the semantic frame may include: sequentially expressing dependents including a subject, an object and an adverb of a certain predicate in the structure of the semantic frame as arguments; and assigning a morpheme analysis result and a named entity analysis result to each argument, and assigns a syntax relation and a semantic role between the predicate and each argument.

The creating of the question-intermediate expression of the lexicon level may include recognizing a question focus from the natural language question, and creating a lexicon level-query format based on a semantic frame including the question focus.

The creating of the question-intermediate expression of the lexicon level may include creating the query format by only using a result of the semantic analysis of the natural language question without assuming a certain knowledgebase.

The creating of the question-intermediate expression of the lexicon level may include: creating the question-intermediate expression including a variable by which the question focus is replaced using a certain sign and a condition which expresses restriction information about the variable; and the condition is expressed by a type predicate semantic frame which represents a type of a correct answer for the variable, and a lexicon predicate semantic frame that has a format obtained by replacing the question focus in the semantic frame by the variable.

The creating of the query may include creating a query specialized in a certain knowledgebase by mapping an argument of the question-intermediate expression into a class defined in the certain knowledgebase or an instance, and mapping a predicate of the question-intermediate expression into a property defined in the certain knowledgebase.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 6 is a diagram illustrating a User Interface (UI) provided in a knowledgebase search (S400) of FIG. 2.

DETAILED DESCRIPTION OF EXEMPLARY EMBODIMENTS

Figure 1:
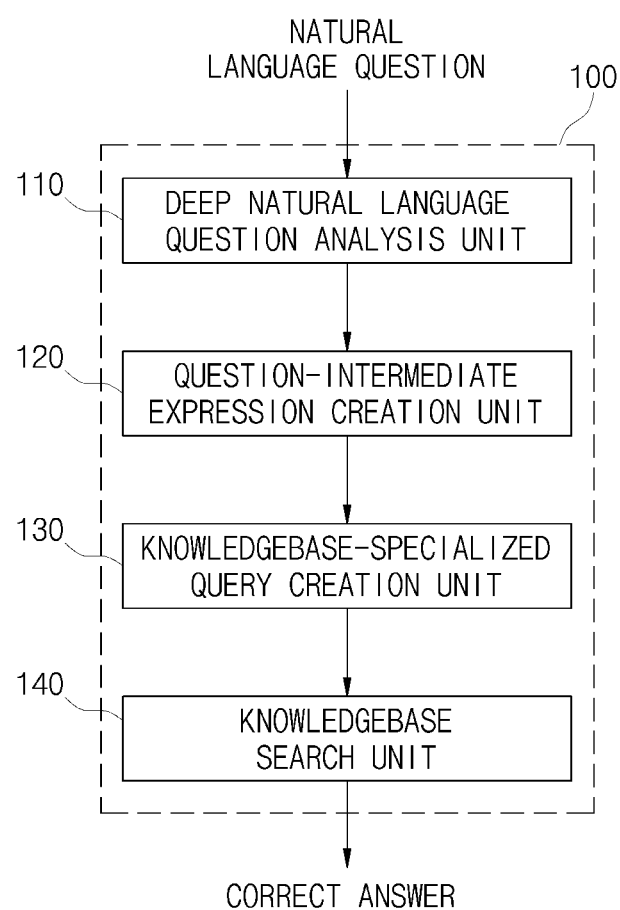
FIG. 1 is a block diagram illustrating a question answering system for structured knowledgebase using deep natural language question analysis according to an exemplary embodiment of the present invention.

The above and other advantages, and a scheme for the advantages of the present invention will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. Meanwhile, the terminology used herein is for the purpose of describing particular embodiments only and is not intended to be limiting of the invention. As used herein, the singular forms "a", "an" and "the" are intended to include the plural forms as well, unless the context clearly indicates otherwise.

Hereinafter, exemplary embodiments of the present invention will be described in detail below with reference to the accompanying drawings. The same reference numerals are used to designate the same elements throughout the drawings In the following description of the present invention, a detailed description of known functions and configurations incorporated herein will be omitted when it may make the subject matter of the present invention rather unclear.

FIG. 1 is a block diagram illustrating a question answering system for structured knowledgebase using deep natural language question analysis according to an exemplary embodiment of the present invention.

Referring to FIG. 1, the question answering system 100 includes a deep natural language question analysis unit 110, a question-intermediate expression creation unit 120, a knowledgebase-specialized query creation unit 130 and a knowledgebase search unit 140.

The deep natural language question analysis unit 110 performs deep natural language analysis on a natural language question that is input, to create a structure of a semantic frame configured to create a question-intermediate expression.

The deep natural language question analysis unit 110 analyzes lexicon, syntax and meaning of a natural language question input, for example, by performing morpheme analysis, named entity analysis, syntax analysis and semantic role analysis of a natural language question that is input.

In addition, the deep natural language question analysis unit 110 creates a structure of a semantic frame by receiving a result of the deep natural language deep analysis of the natural language question. Independent predicate frames are constructed, and relations between the predicate frames are expressed.

The question-intermediate expression creation unit 120 creates a question-intermediate expression of a lexicon level by receiving a semantic frame with respect to the natural langue question. The question-intermediate expression has a query format that is independent of a structure and a content of a certain knowledgebase.

The knowledgebase-specialized query creation unit 130 creates a query (for example, SQL, SPARQL, etc.) to search in a standardized knowledgebase that is subject to search (for example, relational database, RDF repository, etc.) by receiving the question-intermediate expression.

The knowledgebase search unit 140 searches for a correct answer from the knowledgebase that is subject to search by receiving the knowledgebase-specialized query, and provides accuracy of the correct answer, a confidence of the correct answer and an evidence for the correct answer.

The detailed configuration and functions of the natural language question answering system according to an exemplary embodiment of the present invention have been described above. Hereinafter, a natural language question answering method according to an exemplary embodiment of the present invention will be described by stages.

Figure 2:
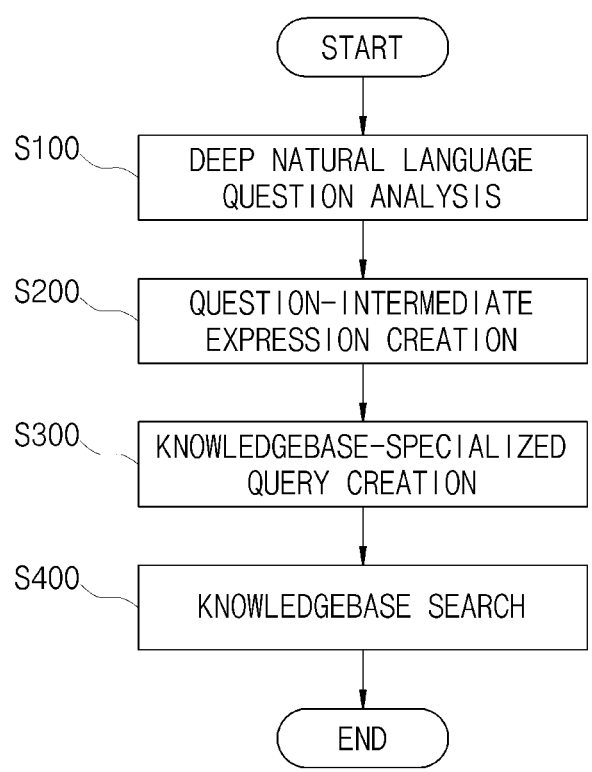
FIG. 2 is a flowchart showing a question answering method for structured knowledgebase using deep natural language question analysis according to an exemplary embodiment of the present invention.

FIG. 2 is a flowchart showing a question answering method for structured knowledgebase using deep natural language question analysis according to an exemplary embodiment of the present invention.

Referring to FIGS. 1 and 2, the deep natural language question analysis unit 110 creates a structure of a semantic frame to create a question-intermediate expression, by performing a deep natural language analysis on a natural language question that is input (S100).

Thereafter, the question-intermediate expression creation unit 120 the question-intermediate expression creation unit 120 creates a question-intermediate expression of a lexicon level by receiving the semantic frame with respect to the natural language question (S200).

Thereafter, the knowledgebase-specialized query creation unit 130 creates a query (for example, SQL, SPARQL, etc.) to search in a standardized knowledgebase that is subject to search (for example, relational database, RDF repository, etc.) by receiving the question-intermediate expression (S300).

Thereafter, the knowledgebase search unit 140 searches for a correct answer from the knowledgebase that is subject to search by receiving the knowledgebase-specialized query, and provides accuracy of the correct answer, a confidence of the correct answer and an evidence for the correct answer (S400).

Hereinafter, the sequence of operations of the question answering method according to an exemplary embodiment of the present invention shown in FIG. 2 will be described in detail with reference to FIGS. 3 to 6.

Figure 3:
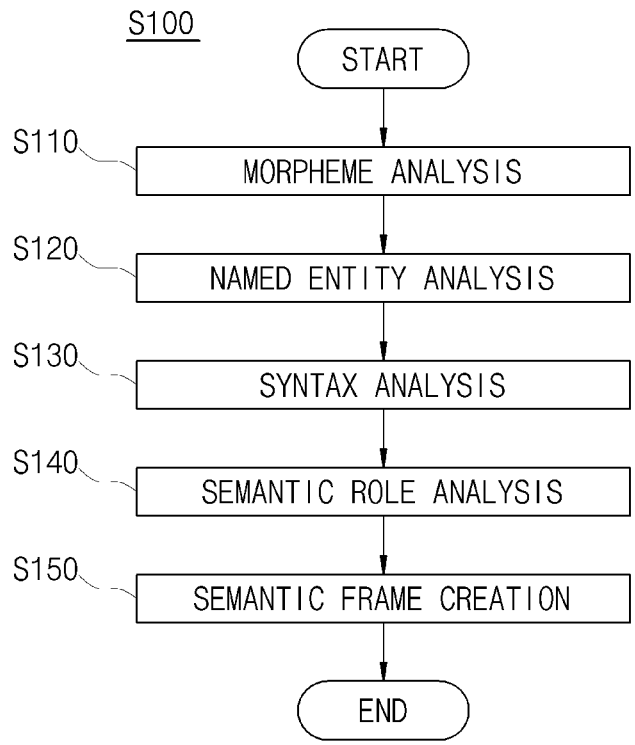
FIG. 3 is a flowchart showing a deep natural language question analysis (S100) of FIG. 2.

FIG. 3 is a flowchart showing the deep natural language question analysis S100.

Referring to FIGS. 1 and 3, the deep natural language question analysis S100 performed by the deep natural language question analysis unit 110 includes a morpheme analysis of a natural language question (S110), a named entity analysis of a natural language question (S120), a syntax analysis of a natural language question (S130), a semantic role analysis of a natural language question (S140), and a semantic frame creation (S150). Table 1 shown below illustrates an example of a result obtained by performing a morpheme analysis, a named entity analysis, a syntax analysis and a semantic role analysis on a natural language question in the deep natural language question analysis unit 110.

TABLE 1

| Sentence No. | Word phrase No | Word phrase | Morpheme analysis | Named entity analysis | Syntax analysis | Semantic role analysis |
| --- | --- | --- | --- | --- | --- | --- |
| 0 | 0 | i | i/MM | — | 1/DP | — |
| 0 | 1 | sarami | saram/NNG + i/JKS | — | 2/NP_SBJ | (Predicate: 2, semantic role: ARG0) |
| 0 | 2 | balgyeonhan | balgeyon/NNG + ha/XSV + n/ETM | — | 3/VP_MOD | — |
| 0 | 3 | Xseonen | X/SL + seon/NNG + en/JX | — | 5/NP_SBJ | (Predicate: 2, semantic role: ARG1), (Predicate: 5, semantic role: ARG0) |
| 0 | 4 | youngsangeuhocksidaereul | youngsan/NNG + euhock/NNG + sidae/NN | — | 5/NP_OBJ | (Predicate: 5, semantic role: ARG1) |

TABLE 1-continued

| Sentence No. | Word phrase No | Word phrase | Morpheme analysis | Named entity analysis | Syntax analysis | Semantic role analysis |
|---|---|---|---|---|---|---|
| 0 | 5 | yeon | G + reul/JKO yeol/VV + en/ETM | — | 6VP_MOD | — |
| 0 | 6 | gyegiga | geygi/NNG + ga/JKC | — | 7NP_SBJ | — |
| 0 | 7 | dweeotda | dwe/VV + eot/EP + da/EF + ./SF | — | — | — |
| 1 | 0 | Nobelmoollihoc ksangeul | nobel/NNP + moolli/NNG + hock/XSN + sang/XSN + eul/JKO | nobelmoollihock sangeul/ CV_PRIZE | 1/NP_OBJ | (Predicate: 1, semantic role: ARG1) |
| 1 | 1 | boden | bod/VV + en/ETM | — | 3/VP_MOD | — |
| d1 | 2 | I | i/MM | — | 3/DP | — |
| 1 | 3 | guahockjanen? | guahock/NNG + ja/XSN + nen/JX + ?/SF | guahockja/CV_OCCUPATION | — | (Predicate: 2, semantic role: ARG0) |

1) Morpheme Analysis (S110)

The deep natural language question analysis unit 110 divides a natural language question in units of morphemes, and assigns a morpheme tag to each morpheme. A result of the morpheme analysis is used in the following operations of natural language analysis including the named entity analysis S120, the syntax analysis S130 and the semantic role analysis S140.

In addition, the result of the morpheme analysis is used as a fundamental lexicon analysis data for class mapping, entity mapping and property mapping that are performed in the knowledgebase-specialized query creation S300 which will be described later.

2) Named Entity Analysis (S120)

The deep natural language question analysis unit 110 recognizes an entity by receiving the result of the morpheme analysis of the natural language question, and assigns a type to the entity. A result of the named entity recognition is used as information for class mapping, entity mapping and property mapping that are performed in the knowledgebase-specialized query creation S300.

Column "named entity analysis" in Table 1 shows an example of a result of the named entity analysis of a natural language question. The type of entity "nobel-moollihocksang (Nobel Prize in Physics)" is "awarded" (CV_PRIZE), and the type of entity "guahockja (scientist)" is "occupation" (CV_OCCUPATION).

3) Syntax Analysis (S130)

The deep natural language question analysis unit 110 analyzes a dependency syntax structure by receiving the result of morpheme analysis of the natural language question, and assigns dependency relation between word phrases. Column "syntax analysis" in table 1 shows a number of a governor word phrase of a corresponding word phrase. For example, a governor of a word phrase "sarami (human)" (sentence 0, word phrase 1) is a word phrase "balgyeonhan (found)" (sentence 0, word phrase 2).

A result of the syntax analysis is used as information for determining an argument to which a semantic role is assigned in the semantic role analysis S140, and is used as information for determining an argument for a predicate frame in the semantic frame creation S150.

4) Semantic Role Analysis (S140)

The deep natural language question analysis unit 110 determines a semantic role of an argument for a predicate of the natural language question based on results of the morpheme analysis and the syntax analysis of the natural language question.

The semantic role is defined as a key semantic case (ARG0-ARG5) and an additional semantic case (ARGM-*), and each of the key semantic case and the additional semantic case is assigned a different meaning at each predicate of the natural language question. For example, "sarami (human)" (sentence 0, word phrase 1) has a semantic role of key semantic case (ARG0) at predicate "balgyeonhan (found)" (sentence 0, word phrase 2). In addition, "X-seonen (X rays)" has a semantic role of key semantic case (ARG1) at predicate "balgyeonhan (found)" (sentence 0, word phrase 2), and at the same time, has a semantic role of key semantic case (ARG0) at predicate "yeon (open)" (sentence 0, word phrase 5).

The result of the semantic role analysis is included in the semantic frame created, to be used as semantic analysis data for class mapping, entity mapping and property mapping in the knowledgebase-specialized query creation S300 which will be described later.

5) Semantic Frame Creation (S150)

The deep natural language question analysis unit 110 creates a semantic frame from the natural language question that has been subject to the morpheme analysis, the named entity analysis and the syntax analysis that have been described above. The semantic frame represents a frame structure that has dependents including a subject, an object and an adverb with respect to a predicate as arguments.

Table 2 below shows an example of a semantic frame created based on the result of analysis of Table 1. Referring to Table 2, semantic frames Frame 01, Frame 02 and Frame 03 are created with respect to three predicates "balgyeonha (found)", "yeol (open)" and "bod (receive)", respectively.

Arguments in each semantic frame are sequentially expressed, and a result of morpheme analysis and a result of named entity analysis are assigned to each argument, and a syntax relation and a semantic role are assigned between a predicate and an argument. If a result of the named entity analysis exists, the corresponding information is recorded in column 'named entity'. Table 1 is illustrated in relation that ARG0 represents "AGENT", and ARG1 represents "THEME" in the result of semantic role assigned.

TABLE 2

Frame 01

| Predicate/Argument | Lexicon | Morpheme | Named entity | Syntax relation | Semantic role |
|---|---|---|---|---|---|
| Predicate | balgyeonha | balgyeon/NNG + ha/XSV | — | — | — |
| A0 | isaram | i/MM + Saram/NNG | | NP_SBJ | ARG0 |
| A1 | X-seon | X/SL + seon/NNG | | VP_MOD | ARG1 |

Frame 02

| Predicate/Argument | lexicon | Morpheme | Named entity | Syntax relation | Semantic role |
|---|---|---|---|---|---|
| Predicate | yeol | yeol/VV | — | — | — |
| A0 | Xseon | X/SL + seon/NNG | | NP_SBJ | ARG0 |
| A1 | youngsangeuhocksidae | youngsang/NNG + euhock/NNG + sidae/NNG | | NP_OBJ | ARG1 |

Frame 03

| Predicate/Argument | lexicon | Morpheme | Named entity | Syntax relation | Semantic role |
|---|---|---|---|---|---|
| Predicate | bod | bod/VV | — | — | — |
| A0 | iguahockja | i/MM + guahock/NNG + ja/XSN | guahockja/ CV_OCCUPATION | VP_MOD | ARG0 |
| A1 | nobelmoollihocksang | nobel/NNG + moolli/NNG + hock/XSN + sang/XSN | nobelmoolli hocksang/ CV_PRIZE | NP_OBJ | ARG1 |

Figure 4:
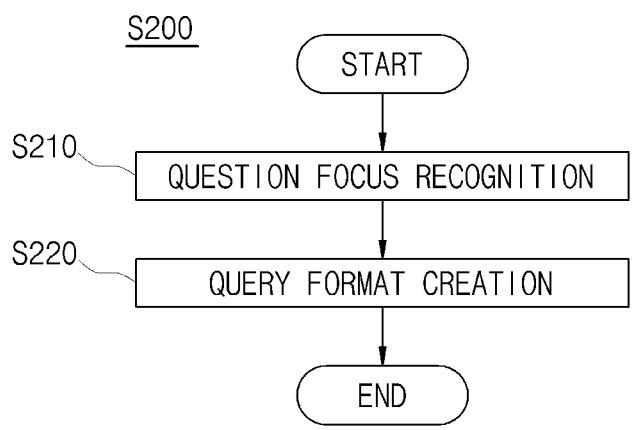
FIG. 4 is a flowchart showing a question-intermediate expression creation (S200) of FIG. 2.

FIG. 4 is a flowchart showing the question-intermediate expression creation S200.

Referring to FIGS. 1 and 4, the question-intermediate expression creation S200 performed by the question-intermediate expression creation unit 120 includes question focus recognition (S210) and query format creation (S220) creating a query format based on a semantic frame including the question focus.

1) Question Focus Recognition (S210)

The question-intermediate expression creation unit 120 creates a question focus from the natural language question that is input. The question focus represents an object of user's interest in a natural language question. In many cases, the question focus is expressed in the form of "a demonstrative pronoun+noun", but may be expressed in various other forms. In Table 2, "isaram (this person)" and "iguahockja (the scientist)" are question focuses.

2) Query Format Creation (S220)

The question-intermediate expression creation unit 120 creates a query format of a lexicon level by receiving the semantic frame created in the semantic frame creation S150, and the question focus recognized in the question focus recognition S210.

Table 3 shows a result of the query format created. The query format includes "variable" and "condition" for the variable. "Variable" is replaced by a question focus using a certain sign, and "condition" represents restriction information about the variable. "Condition" is expressed by two kinds of semantic frames below.

a) Type Predicate Semantic Frame: A type predicate semantic frame is a semantic frame that expresses the type of a variable of a correct answer. In the semantic frame, predicate is a predefined "TYPE", and a first argument represents the value of a variable, and a second argument represents the type of a variable. The type of a variable is expressed as a lexicon of a question focus. In Table 3, the type of the first variable X is "saram (human)", and the type of the second variable Y is "guahockja (scientist)".

b) Lexicon Predicate Semantic Frame: A lexicon predicate semantic frame is a semantic frame that has a format obtained from the semantic frame created in the semantic frame creation S150, by replacing a question focus by a variable. Table 3 expresses a semantic frame corresponding to predicate "balgyeonha (found)", and a semantic frame corresponding to predicate "bod (receive)". In addition, Table 3 has the result of morpheme analysis, the result of named entity recognition, the syntax relation and the semantic role information added thereto.

Meanwhile, "query format" is generated by the question-intermediate expression creation unit 120 by only using the result of semantic analysis with respect to the natural language question without assuming a certain knowledge-base. Accordingly, predicates except for "TYPE" predicates, and arguments except variables are expressed at lexicon levels. In addition, the results of morpheme analysis, named entity analysis, syntax analysis and semantic role analysis are added to the predicates and arguments of lexicon levels, so as to be used as mapping information in the knowledge-base-specialized query creation S300, which is described immediately below.

TABLE 3

| | Morpheme | Named entity | Syntax relation | Semantic role |
|---|---|---|---|---|
| Variable X | | | | |
| Condition Predicate TYPE | | | | |

TABLE 3-continued

| | | Morpheme | Named entity | Syntax relation | Semantic role |
|---|---|---|---|---|---|
| | A0 | X | — | — | — |
| | A1 | saram | saram/NNG | — | — |
| | Predicate | balgyeonha | balgyeon/ NNG + ha/XSV | — | — |
| | A0 | X | — | NP_SBJ | ARG0 |
| | A1 | X서 | X/SL + seon/NNG | — | VP_MOD | ARG1 |
| Variable Condition | Y | | | | |
| | Predicate | TYPE | | | |
| | A0 | Y | | — | — |
| | A1 | guahockja | guahock/NNG + ja/ XSN | guahockja/ CV_OCCUP ATION | — | — |
| | Predicate | bod | bod/VV | — | — | — |
| | A0 | Y | — | — | VP_MOD | ARG0 |
| | A1 | nobelmoollihoc ksang | nobel/NNG + moolli/ NNG + hock/XSN + sang/XSN | nobelmoolli hocksang/C V_PRIZE | NP_OBJ | ARG1 |

Figure 5:
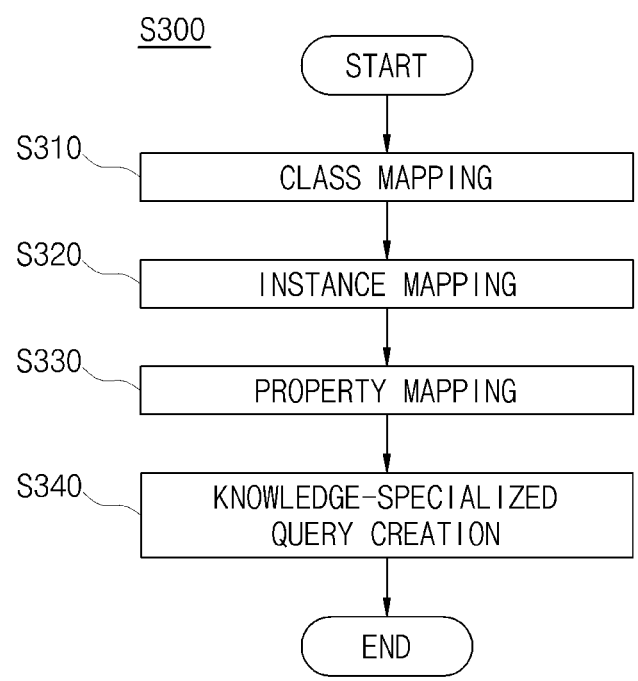
FIG. 5 is a flowchart showing a knowledgebase-specialized query creation (S300) of FIG. 2.

FIG. 5 is a flowchart showing the knowledgebase-specialized query creation S300.

Referring to FIGS. 1 and 5, the knowledgebase-specialized query creation S300 performed by the knowledgebase-specialized query creation unit 130 includes class mapping (S310), instance mapping (S320), property mapping (S330) and query creation (S340).

The knowledgebase-specialized query creation S300 represents an operation of generating a specialized query, such as SPARQL, which is configured to search in a certain knowledgebase, such as RDF repository, by receiving "question-intermediate expression".

In operation S300, the question-intermediate expression" expressed in a lexicon level is mapped to instance and class and property that are defined in a knowledgebase, thereby creating a final query sentence. In general, the knowledgebase includes "schema" including the definition of a class and the definition of a relation between classes (property), an instance of each class and an instance of a property.

Among information about the question-intermediate expression, "argument" is mapped to a class or an instance, and "predicate" is mapped to property. However, since the question-intermediate expression is created without assuming a certain knowledgebase, ambiguity exists in the mapping process. For example, predicate "bod (receive)" may express various meanings in addition to "sangeulbodda (receive a prize)", so the predicate needs to have a meaning "receive a prize" in the example shown in FIG. 3 by removing the ambiguity, and needs to be mapped to property "hasPrize" in knowledgebase.

An argument is subject to various kinds of ambiguous removing processes that are generally known in the art, and is mapped to a unique ID of a class defined in knowledgebase or a unique ID of an instance. As a result, a query specialized in the knowledgebase is created in the query creation S340.

FIG. 6 is a diagram illustrating a User Interface (UI) provided in the knowledgebase search S400.

Referring to FIGS. 1 and 6, the knowledgebase search unit 140 searches in knowledgebase by using the knowledgebase-specialized query that is created in the knowledgebase-specialized query creation S300, and provides an accuracy of a correct answer, a confidence of a correct answer and an evidence for a correct answer.

"The correct answer" shown in FIG. 6 represents an answer finally searched in the knowledgebase and suggested to a user. "The accuracy of a correct answer" represents the degree of matching between a knowledgebase query and an evidence for the correct answer. "The confidence" represents a confidence of knowledge established at the time of constructing the knowledgebase.

For example, knowledge constructed manually by an expert in a field to which the expert belongs or knowledge constructed by a credible organization has a high confidence, and knowledge created through web crawling and automatic text mining has a low confidence. The evidence for the correct answer represents a part of the knowledgebase that is matched to the query.

As described above, the knowledgebase-specialized query according to the present invention is not created at a surface lexicon analysis level of a natural language question, but is created based on a deep language analysis, so that ambiguity occurring at the time of mapping a natural language question and elements of knowledgebase is removed. Accordingly, the natural language question may be less restricted in the format and the content.

In addition, knowledgebase query specialized in knowledgebase is created base on "question-intermediate expression" that is independent of various knowledgebase each having a different format and a different content, thereby effectively responding to creation of queries for various types of knowledgebase.

As is apparent from the above, different from the conventional question answering system based on natural language question in which a knowledgebase-specialized query is created at a level of surface lexicon analysis of a natural language question, the present invention can create a knowledgebase-specialized query based on a deep language analysis, thereby removing ambiguity occurring at the time of mapping a natural language question and elements of knowledgebase, and thus causing less restriction on the formant and the content of a natural language question.

In addition, the present invention can create a knowledgebase query specialized in knowledgebase based on "a question intermediate expression" that is independent of knowledgebase each having a different format and a different content, thereby efficiently responding to creation of queries for various type of knowledgebase.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A question answering system for structured knowledgebase using deep natural language question analysis, the question answering system comprising:
   one or more processors that process computer executable program code embodied in computer readable storage media, the computer executable program code comprising:
   deep natural language question analysis program code that creates a structure of a semantic frame by analyzing a natural language question that is input;
   question-intermediate expression creation program code that creates a question-intermediate expression of a lexicon level based on the semantic frame;
   knowledgebase-specialized query creation program code that creates a query used to search in a knowledgebase that is a subject of search, based on the question-intermediate expression; and
   knowledgebase search program code that finds a correct answer in the knowledgebase that is the subject of search based on the query, and that provides an accuracy of the correct answer, a confidence of the correct answer and an evidence for the correct answer.

2. The question answering system of claim 1, wherein the deep natural language question analysis program code creates the semantic frame by analyzing the natural language question in terms of morpheme, named entity, syntax and semantic role.

3. The question answering system of claim 2, wherein the deep natural language question analysis program code divides the natural language question in units of morphemes, and assigns a morpheme tag to each of the morphemes.

4. The question answering system of claim 2, wherein the deep natural language question analysis program code recognizes an entity of the natural language question based on a result of a morpheme analysis of the natural language question, and assigns a type to the entity.

5. The question answering system of claim 2, wherein the deep natural language question analysis program code assigns a dependency relation between word-phrases by analyzing a dependency syntax structure of the natural language question based on a result of a morpheme analysis of the natural language question.

6. The question answering system of claim 2, wherein the deep natural language question analysis program code determines a semantic role of an argument for a predicate of the natural language question based on results of a morpheme analysis and a syntax analysis of the natural language question.

7. The question answering system of claim 6, wherein the semantic role is defined as a key semantic case and an additional semantic case, and each of the key semantic case and the additional semantic case is assigned a different meaning at each predicate of the natural language question.

8. The question answering system of claim 2, wherein the deep natural language question analysis program code creates the structure of a semantic frame having dependents, including a subject, an object and an adverb with respect to a predicate of the natural language question, as arguments based on results of a morpheme analysis, a syntax analysis and a semantic role analysis of the natural language question.

9. The question answering system of claim 8,
   wherein the deep natural language question analysis program code sequentially expresses dependents including a subject, an object and an adverb of a certain predicate in the structure of the semantic frame as arguments; and
   assigns a morpheme analysis result and a named entity analysis result to each argument, and assigns a syntax relation and a semantic role between the certain predicate and each argument.

10. The question answering system of claim 1, wherein the question-intermediate expression creation program code recognizes a question focus from the natural language question, and creates a lexicon level-query format based on a semantic frame including the question focus.

11. The question answering system of claim 10,
    wherein the question-intermediate expression creation program code creates a question-intermediate expression including a variable by which the question focus is replaced using a certain sign and a condition which expresses restriction information about the variable; and
    the condition is expressed by a type predicate semantic frame which represents a type of a correct answer for the variable, and a lexicon predicate semantic frame that has a format obtained by replacing the question focus in the semantic frame by the variable.

12. The question answering system of claim 1, wherein the knowledgebase-specialized query creation program code creates a query specialized in a certain knowledgebase by mapping an argument of the question-intermediate expression into a class defined in the certain knowledgebase or an instance, and mapping a predicate of the question-intermediate expression into a property defined in the certain knowledgebase.

13. A question answering method for structured knowledgebase using deep natural language question analysis, the question answering method comprising:
    creating a structure of a semantic frame by analyzing a natural language question that is input;
    creating a question-intermediate expression of a lexicon level based on the semantic frame;
    creating a query used to search in a knowledgebase that is a subject of search, based on the question-intermediate expression; and
    finding a correct answer in the knowledgebase that is the subject of search based on the query, and providing an accuracy of the correct answer, a confidence of the correct answer and an evidence for the correct answer.

14. The question answering method of claim 13, wherein the creating of the structure of the semantic frame comprises:
    dividing the natural language question in units of morphemes, and assigning a morpheme tag to each of the morphemes;
    recognizing an entity of the natural language question based on a result of a morpheme analysis of the natural language question, and assigning a type to the entity;
    assigning a dependency relation between word-phrases by analyzing a dependency syntax structure of the natural language question based on a result of the morpheme analysis of the natural language question; and
    determining a semantic role of an argument for a predicate of the natural language question based on results of the morpheme analysis and a syntax analysis of the natural language question.

15. The question answering method of claim 13, wherein the generating of the structure of the semantic frame comprises creating the structure of a semantic frame having dependents, including a subject, an object and an adverb with respect to a predicate of the natural language question, as arguments based on results of a morpheme analysis, a syntax analysis and a semantic role analysis of the natural language question.

16. The question answering method of claim 15, wherein the creating of the structure of the semantic frame comprises:

sequentially expressing dependents including a subject, an object and an adverb of a certain predicate in the structure of the semantic frame as arguments; and assigning a morpheme analysis result and a named entity analysis result to each argument, and assigns a syntax relation and a semantic role between the certain predicate and each argument.

17. The question answering method of claim 13, wherein the creating of the question-intermediate expression of the lexicon level comprises recognizing a question focus from the natural language question, and creating a lexicon level-query format based on a semantic frame including the question focus.

18. The question answering method of claim 17, wherein the creating of the question-intermediate expression of the lexicon level comprises creating the query format by only using a result of a semantic analysis of the natural language question without assuming a certain knowledgebase.

19. The question answering method of claim 17, wherein the creating of the question-intermediate expression of the lexicon level comprises creating a question-intermediate expression including a variable by which the question focus is replaced using a certain sign and a condition which expresses restriction information about the variable; and the condition is expressed by a type predicate semantic frame which represents a type of a correct answer for the variable, and a lexicon predicate semantic frame that has a format obtained by replacing the question focus in the semantic frame by the variable.

20. The question answering method of claim 13, wherein the creating of the query comprises creating a query specialized in a certain knowledgebase by mapping an argument of the question-intermediate expression into a class defined in the certain knowledgebase or an instance, and mapping a predicate of the question-intermediate expression into a property defined in the certain knowledgebase.

* * * * *